Jan. 23, 1962 W. S. ROBOSKI 3,018,359
ELECTRODE MOUNTING ASSEMBLY
Filed Sept. 11, 1959 4 Sheets-Sheet 1
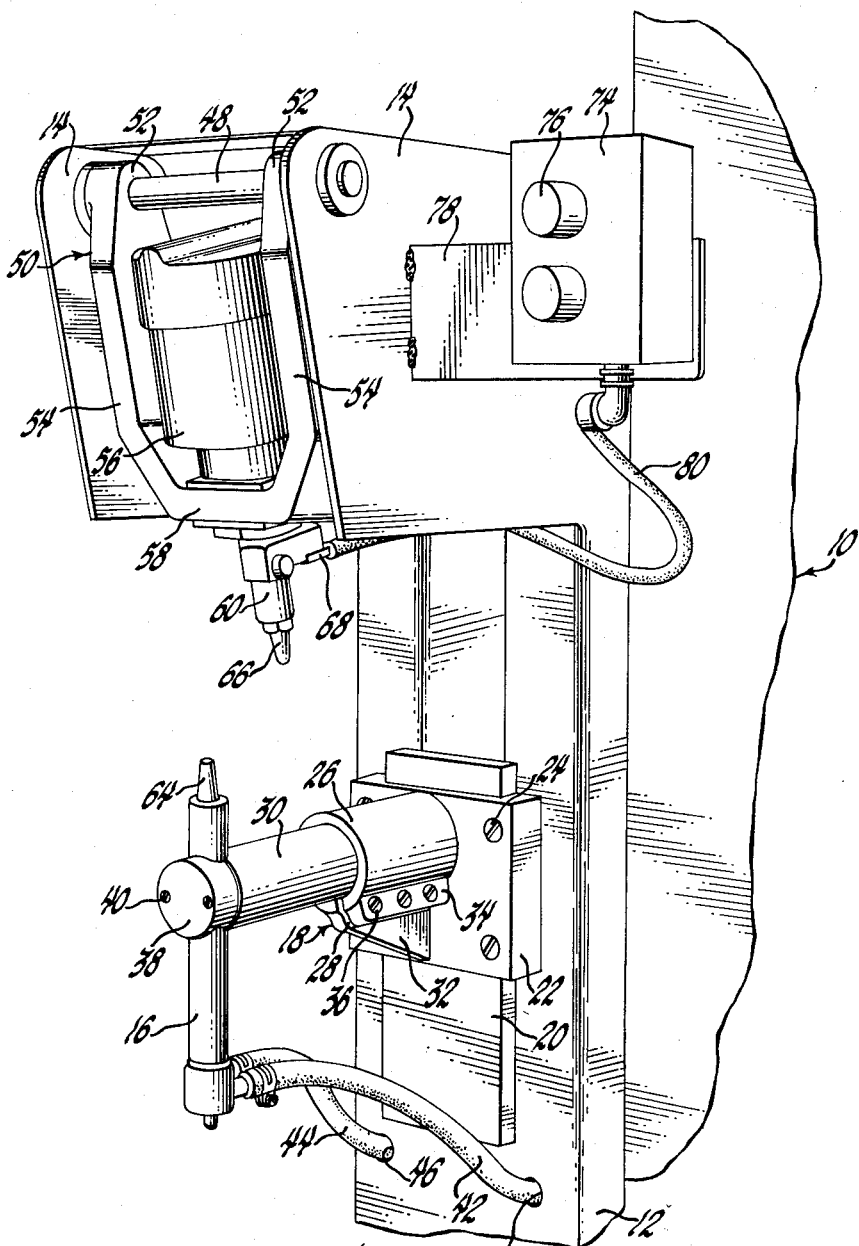
INVENTOR.
Walter S. Roboski
BY
L. D. Burch
ATTORNEY

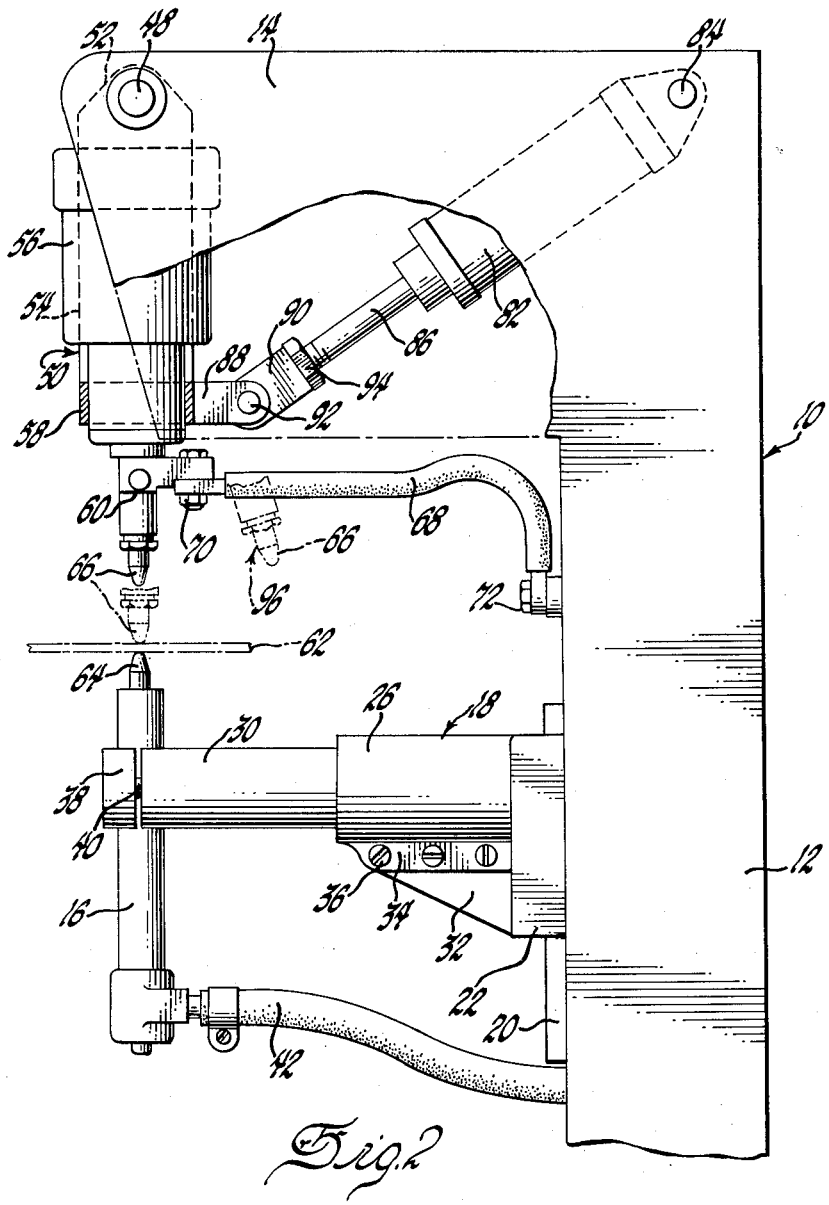

Jan. 23, 1962 W. S. ROBOSKI 3,018,359
ELECTRODE MOUNTING ASSEMBLY
Filed Sept. 11, 1959 4 Sheets-Sheet 3
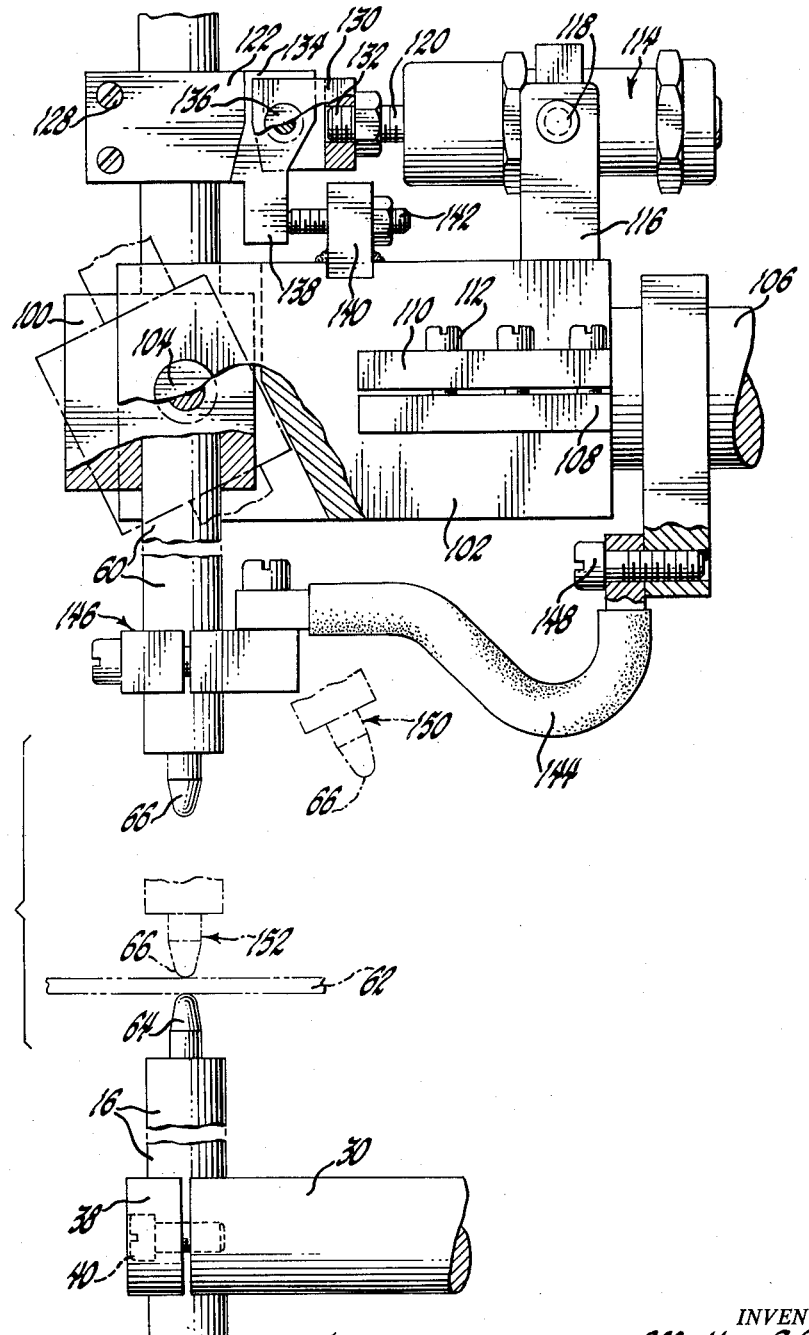
INVENTOR.
Walter S. Roboski
BY
L. D. Burch
ATTORNEY

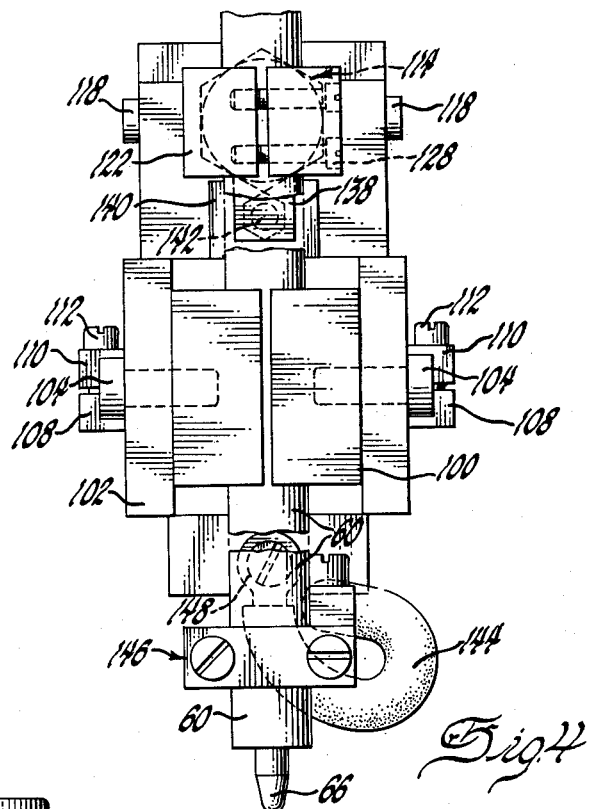
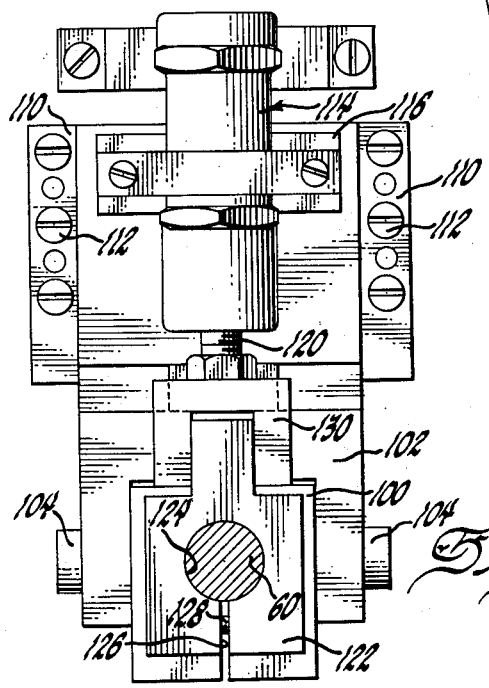

United States Patent Office 3,018,359
Patented Jan. 23, 1962

3,018,359
ELECTRODE MOUNTING ASSEMBLY
Walter S. Roboski, Columbus, Ohio, assignor to General Motors Corporation, Detroit, Mich., a corporation of Delaware
Filed Sept. 11, 1959, Ser. No. 839,405
9 Claims. (Cl. 219—89)

This invention relates to welding machines and more particularly to an upper electrode mounting assembly which permits an upper electrode to be moved out of aligned relation with the lower electrode to facilitate unloading and loading of workpieces in the welding machine.

In generally available welding machines of the spot welding type, two electrodes are utilized, one of the electrodes being reciprocable into and out of the welding position with respect to a stationary second electrode. The degree of travel of the movable electrode is generally not very great, being restricted by the size of the welding machine and the available floor space. Usually, the distance traveled by the movable electrode is little more than is absolutely required to place a workpiece in the machine between the two electrodes.

This condition presents numerous disadvantages in the loading and unloading of workpieces in the machine, and in the degree of safety presented by such a machine. With high volume production, it is almost necessary to provide an automated loading and unloading operation, with some sort of workpiece ejection device, or the like. What is more important, is to provide safety features for the welding machine operator in accordance with national and plantwide safety requirements. The usual machine, with its limited degree of travel of the movable electrode, greatly limits the use of automated loading and unloading devices, since the movable electrode is generally in the path of the automatically ejected workpiece. Further, the machine operator is required to keep his hands in the vicinity of the welding electrodes when loading or unloading workpieces, greatly increasing the chances for accidental injuries.

The device in which this invention is embodied comprises a movable electrode mounting assembly which permits the movable electrode to be pivoted out of alignment with the stationary electrode, greatly increasing the possibility of providing automated loading and unloading devices and greatly increasing the safety aspects of the machine. The movable electrode may be pivotally secured to the machine frame and some sort of pneumatic device provided for moving the electrode out of the way. The distance between the electrodes in the loading and unloading position is thus greatly increased, providing room for automatic loading and unloading devices. The increased distance between the electrodes also presents a much safer arrangement, insofar as operating personnel are concerned, decreasing the possibility of accidental injuries which may be caused by the machine.

These and other advantages will become more apparent from the following description and drawings in which:

FIGURE 1 is a perspective view of a portion of a welding machine, illustrating the pivoted mounting assembly for the movable electrode.

FIGURE 2 is an elevational view of a portion of the machine illustrated in FIGURE 1 with parts broken away and in section showing the position of the various parts.

FIGURE 3 is an elevational view of a modification of the assembly illustrated in FIGURES 1 and 2 with parts broken away and in section to show the relative position of the parts.

FIGURE 4 is an end view of the modification illustrated in FIGURE 3.

FIGURE 5 is a plan view of the modification illustrated in FIGURE 3 to illustrate the position of the various parts.

Referring more particularly to the drawings, a first modification of the structure is illustrated in FIGURES 1 and 2. A machine frame, illustrated generally by the numeral 10, is shown to include a vertical column 12 and a pair of outwardly extended flanges 14. A lower electrode 16 is secured to the column 12 by a bracket assembly, illustrated generally by the numeral 18.

The bracket assembly 18 comprises a plate 20 which may be adjustably secured to the column 12 in order to vary the position of the lower electrode 16. Secured to the plate 20 is a bracket plate 22 held to the plate 20 by a plurality of screws or the like 24. A tubular member 26 is secured in some suitable manner to the bracket plate 22 and has a slot 28 formed therein to permit the tubular portion to expand sufficiently to accept the electrode holder 30. A web 32 and flange 34, forming the slot 28, may be secured together by bolts, or the like, 36 to clamp the electrode holder 30 securely in the tubular portion 26. A cap member 38 is secured to the electrode holder 30 and about the electrode 16 by the screws, or the like, 40 to clamp the electrode 16 and thus rigidly secure the electrode to the machine column 12. Suitable coolant conduits 42 and 44 are connected to the electrode 16 and extend through openings 46 in the machine column 12 to a suitable coolant supply. The electrode holder and the cap 38 are suitably insulated from the electrode 16 in any usual manner, in accordance with safety regulations.

Pivotally secured to the flanges 14 of the machine frame by a pivot pin 48 is a U-shaped member 50. The pivot pin 48 passes through the upper ends 52 of the legs 54 of the member 50, and allows the U-shaped member 50 to pivot about the upper, forward ends of the flanges 14. A welding cylinder 56 is secured in the U-shaped member 50 in any suitable manner and extends through the cross-piece 58 of the U-shaped member 50. A piston (not shown) is disposed in the cylinder 58 and is reciprocable therein, and carries the upper movable electrode 60. The upper electrode may thus be caused to reciprocate into and out of the proper welding relation with respect to the lower electrode 16, as illustrated in the dashed and dotted lines in FIGURE 2. As shown in FIGURE 2, a workpiece 62 is mounted between a lower electrode tip 64 and the upper electrode tip 66 and in a position to be welded.

An electrical conduit 68 is secured to the upper electrode 60, as by the nut and bolt assembly 70, to provide the welding potential required. The conduit 68 is connected, as at 72, to a suitable source of electrical power (not shown).

A control box 74, having start and stop buttons or the like 76, is secured in some suitable manner, as by a plate 78, to the machine frame 10. An electrical conduit 80 extends between the control box 74 and the proper electrical connections (not shown) for operating the welding machine.

Referring now to FIGURE 2, a second cylinder 82 is illustrated as being pivotally secured to the upper rear corner of the machine frame flanges 14 by a pivot pin 84. A piston (not shown) and piston rod 86 are operable in the cylinder 82, the piston rod 86 extending toward the welding cylinder 56. The U-shaped member 50 has a lug 88 extending rearwardly therefrom to which the pivot link 90 is secured by a pivot pin 92. The pivot link 90 is secured to the piston rod 86 by a nut member 94.

The tilt cylinder 82 and its associated piston are operable, as illustrated in FIGURE 2, to tilt the upper electrode 60 and welding cylinder 56 to the right, as viewed in FIGURE 2, toward the machine frame 10. The tilted position is illustrated in dashed and dotted lines as at 96. With the upper electrode 60 in this position, it is easily seen that plenty of room is provided for unloading and loading of workpieces in the welding machine.

Referring now to FIGURE 3, a modification of the mounting assembly is illustrated. The lower electrode 16 is mounted to the machine column (not shown) in a manner similar to that illustrated in FIGURE 1. The holder 30 is secured to the electrode 16 by a cap 38 and the bolts, or the like, 40, and rigidly secured to the machine column 12. The upper electrode 60, with its welding tip 66, is in aligned relation with respect to the lower electrode tip 64, and is received in a pivot block 100 pivotally secured to a body block 102 by a pair of pivot pins 104. The body block 102 is secured to the machine frame by a cylindrical member 106, the block 102 being clamped to the member 106 by the flanges 108 and 110, fastened together by bolts or the like 112. A slot (not shown) formed in either side of the body block 102 and adjacent the member 106 provides for expansion and contraction of the body block 102 and permits it to receive the member 106.

A tilt cylinder, illustrated generally by the numeral 114, is pivotally secured to the body block 102 through the bracket member 116. A pair of pivot pins 118, one through each leg of the bracket member 116, permit relative movement of the tilt cylinder with respect to the body block 102. A piston (not shown) is disposed in the tilt cylinder 114 and has a piston rod 120 extending therefrom in the direction of the upper electrode 60.

A tilt block 122, having an aperture 124 and a slot 126 formed therein, is received about the upper electrode 60 and clamped thereto by means of bolts or the like 128. A bifurcated pivot link 130 is secured to the piston rod 120 in any suitable manner, as by the threaded engagement 132, and receives a lug 134 extending from the tilt block 122. A pivot pin 136 passes through the legs of the bifurcated pivot link 130 and through the lug 134, to allow relative pivotal movement of the parts.

The lug 134 has a downwardly extending portion 138 which permits means for limiting the pivotal movement of the electrode 60 and the parts secured thereto. A lug 140, secured to the body block 102 and extending upwardly therefrom, has a set screw 142, or the like, extending therethrough and adapted to engage the downwardly extending portion 138 of the lug 134. The set screw 142 may be adjusted to position the tilt block 122 and the upper electrode 60 in the proper alignment with respect to the lower electrode 16.

The welding potential is supplied to the upper electrode by a conduit 144 connected to the upper electrode 60 by a bracket assembly, illustrated generally by the numeral 146, and to the machine frame in some suitable manner, as by the bolt 148. Of course, the machine frame and other necessary parts are suitably insulated from the upper electrode in accordance with usual safety requirements.

The operation of the modification illustrated in FIGURES 1 and 2 is as follows:

With the parts in the position shown in FIGURE 1, a workpiece may be loaded in the welding machine adjacent the electrode tip 64 of the lower electrode 16. The tilt cylinder 82 and its associated piston are then operated to pivot the upper electrode 60 and the welding cylinder 56 into the proper aligned relation with respect to the lower electrode 16. The welding cylinder 56 and its associated piston are actuated to lower the electrode tip 66 into the proper welding engagement with the workpiece 62, and the welding operation is carried out. Upon completion of the welding operation, the welding cylinder 56 and its associated piston allow the upper electrode 60 to retract. The tilt cylinder 82 and its associated piston are actuated to tilt the upper electrode and welding cylinder about the pivot pin 48 to the position illustrated in FIGURE 1. In this postion a new workpiece may be loaded in the machine with ease and the cycle repeated.

The operation of the device illustrated in FIGURES 3 through 5 is essentially the same. With the upper electrode tip 66 in a position as shown in dashed and dotted lines at 150, a workpiece may be loaded in the machine adjacent the lower electrode tip 64. The tilt cylinder 114 and its associated piston are actuated to pull the upper end of the upper electrode 60 toward the machine frame, or to the right as viewed in FIGURE 3, pivoting the upper electrode 60 about the pivot pins 104. The upper electrode is then lowered into the proper welding position, illustrated in the dashed and dotted lines at 152, for the actual welding operation. At the completion of the operation, the upper welding electrode 60 is raised to the full line position shown in FIGURE 3, and the tilt cylinder 114 and associated piston are actuated to push the upper end of the electrode 60 away from the machine frame, or to the left as viewed in FIGURE 3, thus returning the electrode tip 66 to the position illustrated at 150. In this position the workpiece is then unloaded and a new workpiece loaded in any convenient manner in the welding machine.

Thus, a welding machine mounting assembly is disclosed which provides great advantages in personnel safety and also provides a more adaptable welding machine for the use of automated loading and unloading devices.

What is claimed:

1. In a welding machine having a frame and a lower electrode secured thereto, an upper electrode assembly comprising an upper electrode, first power means mounted on said frame and operably secured to said upper electrode for moving said upper electrode in a vertical direction with respect to said frame, and second power means pivotally mounted on said frame and operably connected to said upper electrode for tilting said upper electrode toward said frame when said upper electrode is in its uppermost position to facilitate loading and removal of workpieces in said welding machine.

2. An upper electrode mounting assembly for use in a welding machine having a frame and a stationary lower electrode secured thereto and comprising an upper electrode, first power means pivotally secured to said frame and rigidly secured to said upper electrode and operable to move said upper electrode upwardly and downwardly along a line extending vertically from the tip of said lower electrode, second power means pivotally secured to said frame and secured to said upper electrode and operable to tilt said upper electrode toward said frame and out of the line extending from the tip of said lower electrode for facilitating unloading and loading of workpieces in said welding machine.

3. An upper electrode mounting assembly for use in a welding machine having a frame and a stationary lower electrode and comprising an upper electrode, means secured to said frame and to said upper electrode for reciprocating said upper electrode into and out of welding relation with said lower electrode, and power means pivotally secured to said frame and secured to said upper electrode and operable to tilt said upper electrode toward said frame and out of aligned relation with said lower electrode to facilitate unloading and loading of workpieces in said welding machine.

4. An upper electrode mounting assembly for use with a welding machine having a frame and stationary lower electrode and comprising an upper electrode, a first cylinder pivotally secured to said frame, a first piston disposed in said cylinder and secured to said upper electrode, said first piston and cylinder being operable to reciprocate said upper electrode into and out of welding relation with said lower electrode, a second cylinder pivotally secured in said frame, and a second piston disposed in said second cylinder and having a piston rod extending therefrom and secured to said upper electrode, said second cylinder and said second piston being operable to tilt said upper electrode toward said frame and out of aligned relation with said lower electrode to facilitate unloading and loading of workpieces in said welding machine.

5. An upper electrode mounting assembly for use with a welding machine having a frame and a stationary lower electrode and comprising a U-shaped member pivotally secured to said frame at the ends of the legs thereof, a first cylinder secured in said U-shaped member and movable therewith, a first piston disposed in said first cylinder and reciprocable therein, an upper electrode secured to said first piston and reciprocable therewith into and out of a welding position with respect to said lower electrode, a second cylinder pivotally secured at one end to said frame and spaced from said first cylinder, a second piston disposed in said second cylinder and reciprocable therein, a piston rod secured to said second piston at one end and to said upper electrode at the other end, said second piston and said piston rod being operable to tilt said upper electrode out of aligned relation with said lower electrode and toward said frame to facilitate unloading and loading of workpieces in said welding machine.

6. An upper electrode mounting assembly for use in a welding machine having a frame and a stationary lower electrode and comprising a U-shaped member pivotally connected to said frame, a cylinder secured in said member and movable therewith, a piston disposed in said cylinder, an upper electrode secured to said piston, said cylinder and said piston being operable to reciprocate said upper electrode into and out of welding position with respect to said lower electrode, and power means secured to said frame and to said upper electrode for moving said upper electrode out of alignment with said lower electrode for facilitating the unloading and loading of workpieces in said welding machine.

7. An upper electrode mounting assembly for use with a welding machine having a frame and a stationary lower electrode and comprising a body member secured to said frame and having a slot formed in one end thereof, a pivot block pivotally secured in said slot in said body member, an upper electrode secured in said pivot block and movable therewith, a tilt block secured to said upper electrode adjacent said body member, and means secured to said body member and to said upper electrode and operable to tilt said upper electrode about said pivotal securement in said slot in said body member out of alignment with said lower electrode for facilitating the unloading and loading of workpieces in said welding machine.

8. An upper electrode mounting assembly for use with a welding machine having a frame and a stationary lower electrode and comprising a body block secured to said frame and having a slot in one end thereof, a pivot block pivotally secured to said body block and in said slot, an upper electrode secured in said pivot block and movable therewith, a tilt block secured to said upper electrode above said body block, a cylinder pivotally mounted on said body block and adjacent said tilt block, a piston disposed in said cylinder and pivotally secured to said tilt block, said piston and said cylinder being operable to tilt said upper electrode out of aligned relation with said lower electrode for facilitating unloading and loading of workpieces in said welding machine.

9. The upper electrode mounting assembly set forth in claim 8 and further having limit stop means mounted on said body block and engageable with said tilt block for limiting the pivotal movement of said upper electrode.

References Cited in the file of this patent

UNITED STATES PATENTS

| | | |
|---|---|---|
| 2,041,913 | Fassler | May 26, 1936 |
| 2,163,930 | Biederman | June 27, 1939 |
| 2,274,122 | Biederman | Feb. 24, 1942 |